United States Patent
Liu et al.

(10) Patent No.: US 10,762,270 B2
(45) Date of Patent: Sep. 1, 2020

(54) CLOCK TREE SYNTHESIS METHOD

(71) Applicant: REALTEK SEMICONDUCTOR CORPORATION, Hsinchu (TW)

(72) Inventors: En-Cheng Liu, Taoyuan (TW); I-Ching Tsai, Hsinchu (TW); Yun-Chih Chang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/391,374

(22) Filed: Apr. 23, 2019

(65) Prior Publication Data

US 2019/0392109 A1   Dec. 26, 2019

(30) Foreign Application Priority Data

Jun. 21, 2018 (TW) .............................. 107121286 A (51) Int. Cl.
*G06F 30/394* (2020.01)
*G06F 30/392* (2020.01)
*G06F 30/396* (2020.01)

(52) U.S. Cl.
CPC .......... *G06F 30/394* (2020.01); *G06F 30/392* (2020.01); *G06F 30/396* (2020.01)

(58) Field of Classification Search
CPC combination set(s) only.
See application file for complete search history.

(56) References Cited

U.S. PATENT DOCUMENTS

| | | | | |
|---|---|---|---|---|
| 7,600,208 | B1* | 10/2009 | Sharma | G06F 30/367 716/120 |
| 8,402,415 | B2* | 3/2013 | Fukunaga | G06F 30/00 716/126 |
| 2002/0144217 | A1* | 10/2002 | Lin | G06F 30/39 716/119 |
| 2004/0256712 | A1* | 12/2004 | Ozawa | G06F 30/394 257/691 |
| 2005/0097492 | A1* | 5/2005 | Matsumura | G06F 30/39 257/207 |
| 2005/0251775 | A1* | 11/2005 | Wood | G06F 30/367 716/124 |
| 2008/0244497 | A1* | 10/2008 | Zhao | G06F 30/394 716/130 |
| 2014/0082575 | A1* | 3/2014 | Hu | G06F 30/36 716/112 |
| 2015/0186586 | A1* | 7/2015 | Pillai | G06F 30/392 716/123 |
| 2015/0270181 | A1* | 9/2015 | De | H01L 22/12 438/14 |

(Continued)

*Primary Examiner* — Stacy Whitmore
(74) *Attorney, Agent, or Firm* — WPAT, PC (57) ABSTRACT

The invention discloses a clock tree synthesis method including steps of: determining a driving strength of a clock cell; determining a reserved space corresponding to the clock cell according to the driving strength; generating the clock cell and the reserved space, wherein the reserved space is adjacent to the clock cell; setting a decoupling capacitor filler cell in the reserved space, wherein the area and/or capacitance of the decoupling capacitor filler cell are/is associated with the driving strength; and fixing the attribute (s) of the clock cell and the attribute(s) of the decoupling capacitor filler cell.

7 Claims, 6 Drawing Sheets

(56) References Cited

U.S. PATENT DOCUMENTS

| | | | | |
|---|---|---|---|---|
| 2015/0302127 A1* | 10/2015 | Huang | ................ | G06F 30/398 |
| | | | | 716/55 |
| 2018/0144086 A1* | 5/2018 | Chung | ................ | G06F 30/392 |
| 2019/0220571 A1* | 7/2019 | Chung | .................. | G06F 30/39 |

* cited by examiner

CLOCK TREE SYNTHESIS METHOD

BACKGROUND OF THE INVENTION

1. Field of the Invention

The present invention relates to clock trees, and, more particularly, to a clock tree synthesis (CTS) method.

2. Description of Related Art

Figure 1:
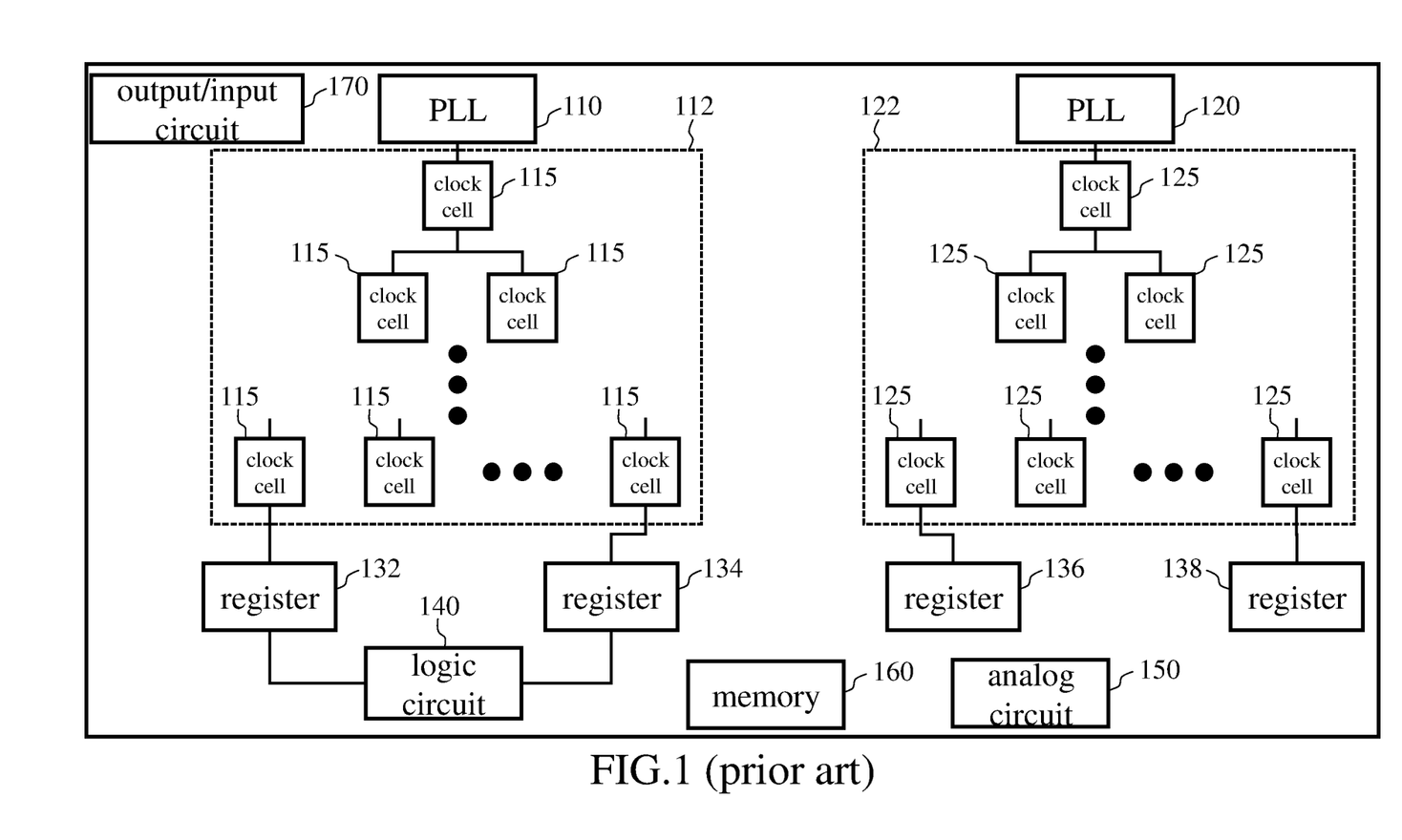
FIG. 1 illustrates a schematic diagram of a conventional circuit layout.

Clock trees are widely used in modern integrated circuits. FIG. 1 is a schematic diagram of a conventional circuit layout that includes two clock trees: the clock tree 112 and the clock tree 122. The clock tree 112 includes a plurality of clock cells 115, and the clock tree 122 includes a plurality of clock cells 125. A clock cell is, for example, an inverter or a buffer. The clock tree 112 is electrically connected to the phase-locked loop (PLL) 110 that provides clock to the registers 132 and 134 via the clock tree 112. The clock tree 122 is electrically connected to the PLL 120 that provides clock to the registers 136 and 138 via the clock tree 122. The logic circuit 140 is coupled between the register 132 and the register 134 and forms a data path therebetween. Components such as the analog circuit 150, the memory 160, and the output/input circuit 170 are also included in the circuit. For reason of simplicity, the wirings connecting the analog circuit 150, the memory 160, and the output/input circuit 170 with other components are not shown in FIG. 1.

Before a clock tree is synthesized, a floorplan step and a placement optimization step are performed. Floorplan refers to the arrangement of the components. Placement optimization refers to the optimization of the data paths. Since the width of the polycrystal is getting smaller as the process advances, an electromigration effect may occur when clock cells with strong driving strength are close to each other. Moreover, the IR drop issue must also be taken into consideration in the circuit design as the power consumption of the clock cells gets higher as a result of increased chip clock (i.e., higher toggle rate). Accordingly, the clock cells are arranged in a way that they are not too close to each other to reduce the probability that the circuit fails the electromigration test and the IR drop test. However, parameters corresponding to the spaces reserved between the clock cells, such as the clock cell spacing, are not mandatory for the physical implementation tool, that is, the parameters are soft constraints rather than hard constraints. As a result, even if appropriate spaces between the clock cells are reserved in the floorplan step, the spaces may become too small after the clock tree is synthesized, causing the circuit to fail the test.

Therefore, there is a demand for a clock tree synthesis (CTS) method to ensure that there is sufficient space between the clock cells or between the clock cells and other elements after the clock tree is synthesized.

SUMMARY OF THE INVENTION

In view of the issues of the prior art, an object of the present invention is to provide a clock tree synthesis method, so that a circuit is more likely to pass the electromigration test and the IR drop test.

A clock tree synthesis method is provided. The clock tree synthesis method includes the steps of: selecting a clock cell; setting a keep-out margin for the clock cell; performing clock tree synthesis to generate the clock cell and a reserved space adjacent to the clock cell, wherein the size of the reserved space corresponds to the keep-out margin; disposing a decoupling capacitor filler cell in the reserved space, wherein an area and/or capacitance of the decoupling capacitor filler cell are/is related to the keep-out margin; and fixing an attribute of the clock cell and an attribute of the decoupling capacitor filler cell.

A clock tree synthesis method is also provided. The clock tree synthesis method includes the steps of: determining a driving strength of a clock cell; determining a reserved space corresponding to the clock cell according to the driving strength; generating the clock cell and the reserved space, wherein the reserved space is adjacent to the clock cell; disposing a decoupling capacitor filler cell in the reserved space, wherein an area and/or capacitance of the decoupling capacitor filler cell are/is related to the driving strength; and fixing an attribute of the clock cell and an attribute of the decoupling capacitor filler cell.

The clock tree synthesis method of the present invention can ensure that there is sufficient space between a clock cell and another clock cell or between a clock cell and other elements after the clock tree is synthesized (i.e., after the clock cell is formed). Electromigration and IR drop are less likely to happen in the clock tree generated according to the clock tree synthesis method of the present invention than in the clock tree of the conventional technology, so that the clock tree of the present invention is easier to pass the test, and the service life and stability of the circuit can be improved.

These and other objectives of the present invention no doubt become obvious to those of ordinary skill in the art after reading the following detailed description of the preferred embodiments with reference to the various figures and drawings.

DETAILED DESCRIPTION OF THE EMBODIMENTS

The following description is written by referring to terms of this technical field. If any term is defined in this specification, such term should be explained accordingly. In addition, the connection between objects or events in the below-described embodiments can be direct or indirect provided that these embodiments are practicable under such connection. Said "indirect" means that an intermediate object or a physical space exists between the objects, or an intermediate event or a time interval exists between the events.

The disclosure herein includes a clock tree synthesis method. Some or all of the processes of the clock tree synthesis method may be implemented by software and/or firmware. A person having ordinary skill in the art can choose components or steps equivalent to those described in this specification to carry out the present invention, which means that the scope of this invention is not limited to the embodiments in the specification.

Figure 2:
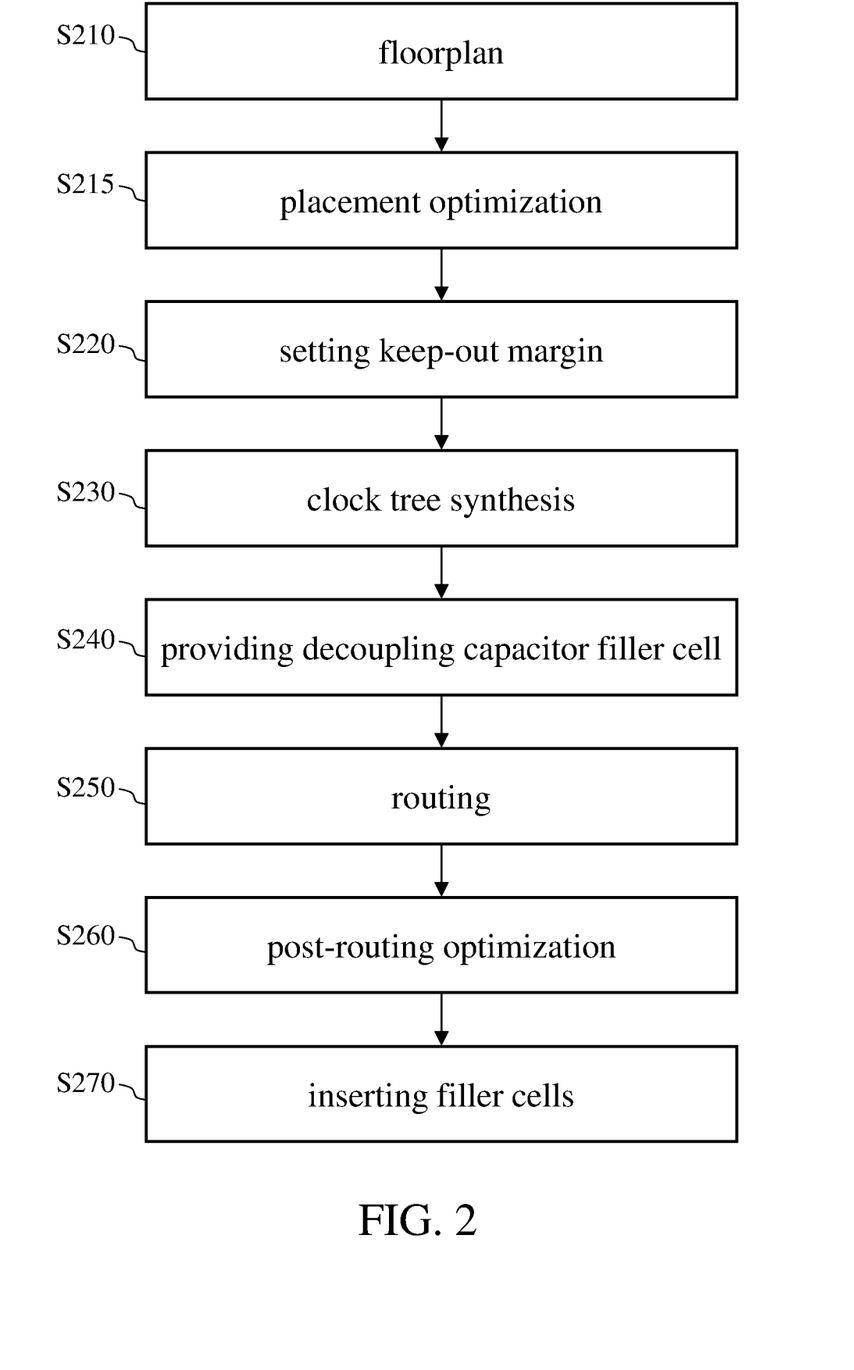
FIG. 2 illustrates a flow chart of a clock tree synthesis method according to an embodiment of the present invention.

FIG. 2 is a flow chart of a clock tree synthesis method according to an embodiment of the present invention. The floorplan step (step S210) includes selecting a clock cell from a clock cell library. This step determines the driving strength of the clock cell. In other words, this step selects the clock cell according to the required driving strength. However, in order to pass the electromigration test and the IR drop test, most of the time this step does not select the clock cell with the strongest driving strength. After the step S210 is completed, the method performs placement optimization (step S215) and then sets a keep-out margin of the clock cell (step S220). Step S220 can be carried out on the physical implementation tool through a "set_keepout_margin" instruction or an equivalent instruction. For the physical implementation tool, this keep-out margin is a hard constraint indicates the size of the reserved space adjacent to the clock cell. For example, the keep-out margin may indicate the area, side length, or perimeter of the reserved space. This keep-out margin is related to the driving strength of the clock cell. In some embodiments, the stronger the driving strength of the clock cell is, the larger the keep-out margin is, and the weaker the driving strength of the clock cell is, the smaller the keep-out margin is. In general, the greater the driving strength of the clock cell is, the larger the area of the clock cell is, meaning that the area of the reserved space can be proportional to the area of the clock cell. In other words, the keep-out margin can also be set according to the size of the clock cell. A larger reserved space can receive a larger decoupling capacitor.

Figure 3:
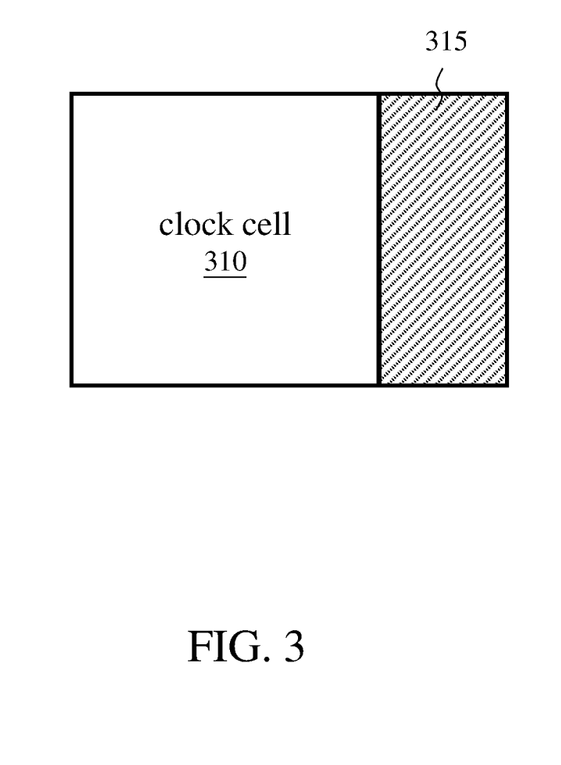
FIG. 3 illustrates a top view of a clock cell accompanied by a reserved space.

Next, clock tree synthesis is performed according to the selected clock cell and the set keep-out margin, so as to generate the clock cell and the reserved space (step S230). FIG. 3 is a top view of a clock cell accompanied by a reserved space. The reserved space 315 is adjacent to the clock cell 310. The example of FIG. 3 approximates the clock cell 310 as a quadrilateral element, but the clock cell 310 can also be approximated as other polygons, and the reserved space 315 may be arranged on any side of the clock cell 310. All the clock cells that have been set to have the keep-out margin in step S220 are accompanied by the reserved space after step S230 is completed. Since the keep-out margin is treated as a hard constraint by the physical implementation tool, when performing the clock tree synthesis step the physical implementation tool determines that the clock cell that has been set to have the keep-out margin needs to occupy a relatively large space.

Next, a decoupling capacitor filler cell is provided for the clock cell that has been set to have the keep-out margin, that is, a decoupling capacitor is disposed (or inserted) in the reserved space 315 (step S240). The area and/or capacitance of the decoupling capacitor are/is related to the reserved space 315 (i.e., related to the keep-out margin). In some embodiments, the larger the keep-out margin or the reserved space is, the larger the area and capacitance of the decoupling capacitor are. In other words, the decoupling capacitor can also be selected according to the driving strength or size of the clock cell.

Figure 4:
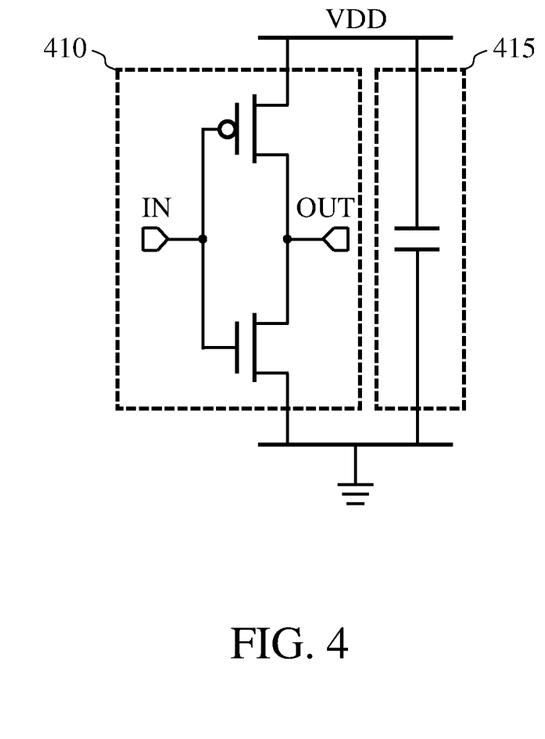
FIG. 4 illustrates a schematic diagram of a clock cell and a decoupling capacitor adjacent to the clock cell.

After step S240 is completed, the clock cell is electrically connected to the decoupling capacitor. FIG. 4 shows a schematic diagram of a clock cell and a decoupling capacitor adjacent to the clock cell. Electrically, the decoupling capacitor 415 is connected in parallel with the clock cell 410 ("IN" is the input of the clock cell 410, and "OUT" is the output of the clock cell 410). The decoupling capacitor 415 can reduce dynamic drop of the voltage source VDD, thus reducing the effect of the IR drop. Next, routing is performed to appropriately connect the elements on the circuit (step S250), and finally optimization is performed after routing (step S260) and then the filler cells are inserted (step S270). Steps S250 to S270 are conventional steps, and the details are omitted for brevity. However, this invention is different from the prior art in that the conventional clock tree synthesis method does not have any decoupling capacitor filler cell formed in the circuit (i.e., the clock cell is not connected in parallel with any decoupling capacitor) before steps S250 to S270, whereas in the present invention the decoupling capacitor filler cell has already been formed in the circuit (formed at step S240) before steps S250 to S270 are performed.

Figure 5:
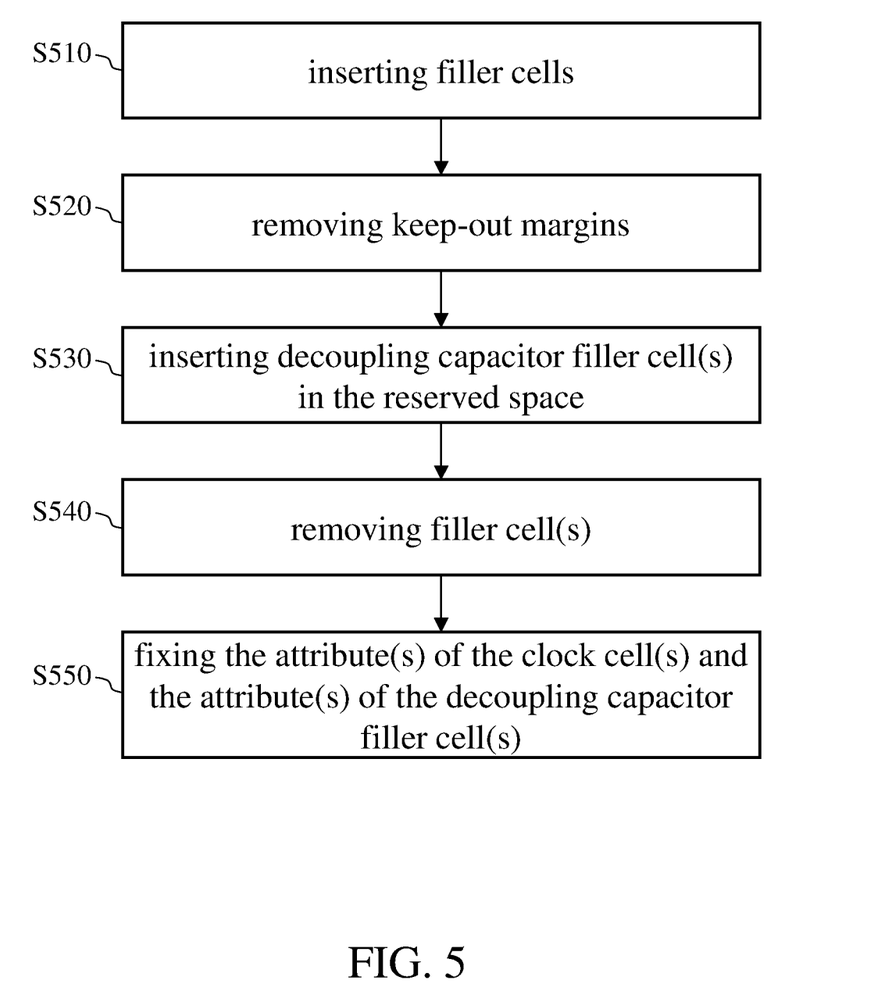
FIG. 5 illustrates a detailed flow of step S240 of FIG. 2.

FIG. 5 is a detailed flow of step S240. After the synthesis of the clock tree is completed and before the keep-out margin is removed, multiple filler cells are inserted in the circuit (step S510). The filler cell is a structure that contains polycrystals but no metal. After step S510 is completed, non-occupied parts of the circuit (i.e., areas not taken by the clock cells, the reserved spaces, and the components (including but not limited to the PLL, register, logic circuit, analog circuit, memory, and output/input circuit)) are filled with filler cells. The keep-out margins are then removed (step S520). The instruction on the physical implementation tool corresponding to step S520 is "remove_keepout_margin" (or an equivalent instruction). For the physical implementation tool, the reserved space on the circuit is no longer occupied after step S520 is completed, that is, from the perspective of the physical implementation tool, there is no component disposed in the reserved space. Next, the decoupling capacitor filler cell(s) is(are) disposed (or inserted) in the reserved space(s) (step S530). After step S530 is completed, the clock cell(s) that has(have) been set to have the keep-out margin (i.e., the clock cell(s) having an adjacent reserved space) is(are) connected in parallel with the decoupling capacitor(s) (as shown in FIG. 4) Finally, the filler cell(s) is(are) removed (step S540), and then the attribute(s) of the clock cell(s) and the attribute(s) of the decoupling capacitor filler cell(s) are fixed (step S550). Step S550 aims to make the positions of the clock cell(s) and the decoupling capacitor filler cell(s) fixed and therefore not change in the subsequent steps. The attribute(s) referred to in step S550 include(s), for example, position information of the clock cell(s) and the decoupling capacitor filler cell(s).

Figure 6:
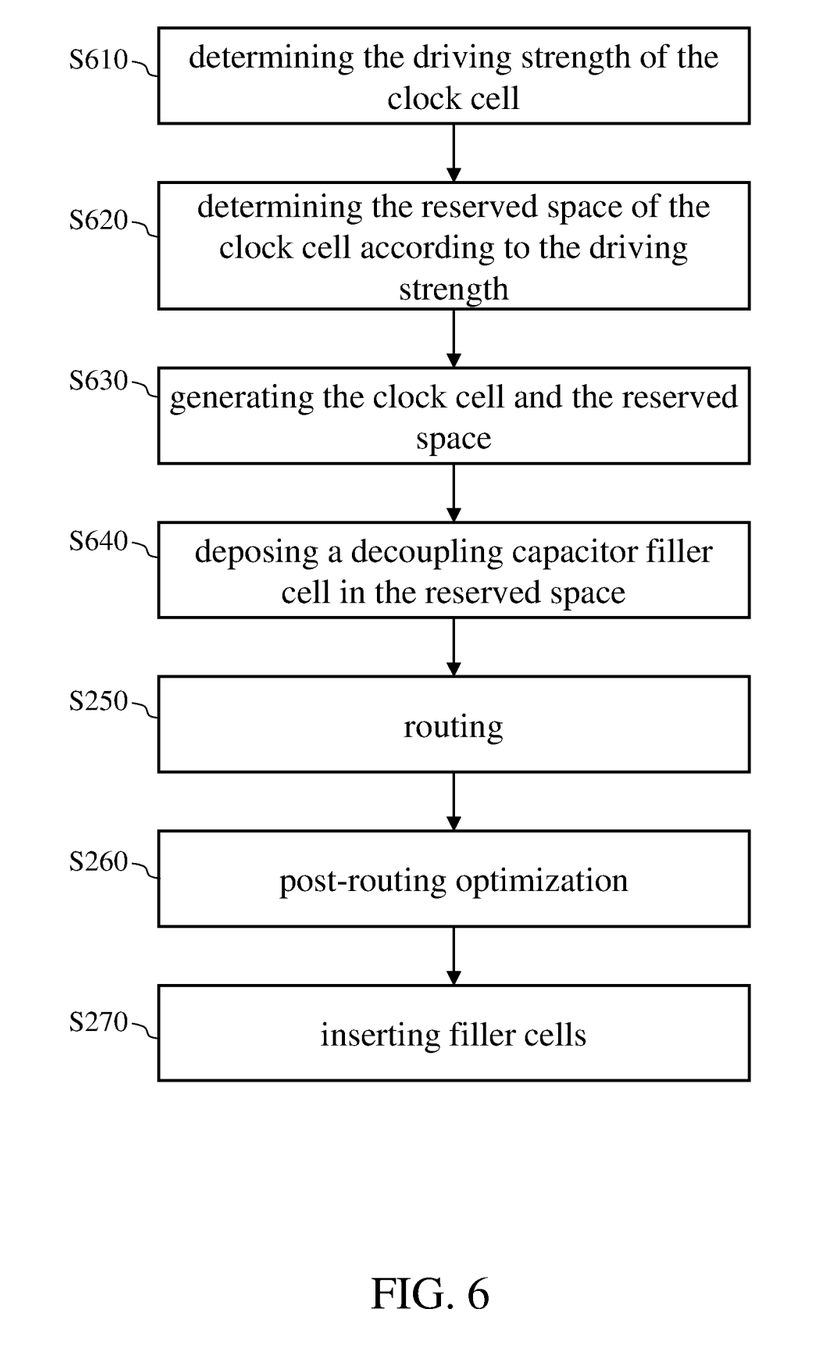
FIG. 6 illustrates a flow chart of a clock tree synthesis method according to another embodiment of the present invention.

FIG. 6 is a flow chart of a clock tree synthesis method according to another embodiment of the present invention. First, the driving strength of the clock cell is determined (step S610), that is, an appropriate clock cell is selected according to requirements (e.g., the size of the clock tree, the position of the clock cell, and the like). Then, the reserved space of the clock cell is determined according to the driving strength of the clock cell (step S620), that is, the size of the reserved space is related to the driving strength and/or area of the clock cell. A clock cell and a reserved space are then generated with the reserved space adjacent to the clock cell (as shown in FIG. 3) (step S630). Next, a decoupling capacitor filler cell is disposed (or inserted) in the reserved space (step S640). The area and/or capacitance of the decoupling capacitor filler cell are/is related to the driving strength and/or area of the clock cell. The detailed flow of step S640 is shown in FIG. 5. After step S640 is completed, steps S250 to S270 are performed.

In some embodiments, the clock cell 310 and the reserved space 315 of FIG. 3 are closely adjacent to each other, and there is no space for more filler cells to be inserted between them.

The invention can cause the physical implementation tool to take into consideration, when the clock tree is being synthesized, the influences of the inserted decoupling capacitor filler cell on clock latency and clock skew of the circuit. Therefore, the result obtained when the clock tree synthesis is completed can be consistent with the result obtained after the decoupling capacitor filler cell(s) is(are) disposed (or inserted). By setting the keep-out margin (i.e., setting the reserved space) before the clock tree synthesis step, and setting the decoupling capacitor filler cell(s) and fixing the attribute(s) of the decoupling capacitor filler cell(s) and the clock cell(s) before routing, a certain space between the clock cell and other clock cells or components can be ensured by the utilization of the decoupling capacitor(s), thereby leading to more evenly distributed clock cells. Furthermore, since the capacitor of the decoupling capacitor filler cell per se can reduce IR drop, the present invention can effectively mitigate the electromigration and/or IR drop issue(s) in the region in which the clock cell(s) is(are) set.

Since a person having ordinary skill in the art can appreciate the implementation detail and the modification thereto of the present method invention of through the disclosure of the device invention of, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are exemplary for understanding, not for limiting the scope of this invention.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A clock tree synthesis method comprising:
   selecting a clock cell;
   setting a keep-out margin for the clock cell;
   performing clock tree synthesis to generate the clock cell and a reserved space adjacent to the clock cell, wherein the size of the reserved space corresponds to the keep-out margin;
   inserting, in areas other than the clock cell and the reserved space, a plurality of filler cells containing polycrystals;
   removing the keep-out margin;
   inserting a decoupling capacitor filler cell in the reserved space, wherein an area and/or capacitance of the decoupling capacitor filler cell are/is related to the keep-out margin;
   removing the filler cells; and
   fixing a position of the clock cell and a position of the decoupling capacitor filler cell.

2. The method of claim 1, wherein the keep-out margin is set according to a driving strength of the clock cell.

3. The method of claim 2, wherein the stronger the driving strength is, the larger the keep-out margin is, and the weaker the driving strength is, the smaller the keep-out margin is.

4. The method of claim 1 further comprising:
   performing routing and optimization after the position of the clock cell and the position of the decoupling capacitor filler cell are fixed; and
   inserting a plurality of filler cells after routing.

5. A clock tree synthesis method comprising:
   determining a driving strength of a clock cell;
   determining a reserved space corresponding to the clock cell according to the driving strength;
   generating the clock cell and the reserved space, wherein the reserved space is adjacent to the clock cell;
   inserting, in areas other than the clock cell and the reserved space, a plurality of filler cells containing polycrystals;
   inserting a decoupling capacitor filler cell in the reserved space, wherein an area and/or capacitance of the decoupling capacitor filler cell are/is related to the driving strength;
   removing the filler cells; and
   fixing a position of the clock cell and a position of the decoupling capacitor filler cell.

6. The method of claim 5, wherein the stronger the driving strength is, the larger the reserved space and the decoupling capacitor filler cell are, and the weaker the driving strength is, the smaller the reserved space and the decoupling capacitor filler cell are.

7. The method of claim 5 further comprising:
   performing routing and optimization after the position of the clock cell and the position of the decoupling capacitor filler cell are fixed; and
   inserting a plurality of filler cells after routing.

* * * * *